US012609983B2

(12) United States Patent
Dhakal et al.

(10) Patent No.: US 12,609,983 B2
(45) Date of Patent: Apr. 21, 2026

(54) DYNAMIC DISCOVERY AND DEPLOYMENT OF SENSORS AND LEAF DEVICES AS SERVICES IN A DISTRIBUTED ENVIRONMENT

(71) Applicant: Schlumberger Technology Corporation, Sugar Land, TX (US)

(72) Inventors: Aakarshan Dhakal, Menlo Park, CA (US); Bernard Van Haecke, Menlo Park, CA (US); Chen Lin, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 114 days.

(21) Appl. No.: 18/821,424

(22) Filed: Aug. 30, 2024

(65) Prior Publication Data

US 2026/0067354 A1    Mar. 5, 2026

(51) Int. Cl.
*H04L 67/1001*       (2022.01)
*H04L 67/12*          (2022.01)

(52) U.S. Cl.
CPC ........ *H04L 67/10015* (2022.05); *H04L 67/12* (2013.01)

(58) Field of Classification Search
CPC ................. H04L 67/10; H04L 67/1001; H04L 67/10015; H04L 67/12
See application file for complete search history.

*Primary Examiner* — Boris D Grijalva Lobos
(74) *Attorney, Agent, or Firm* — Kyle R. Miiller

(57) ABSTRACT

Certain aspects of the disclosure provide a method, comprising discovering a sensor device, over a connection, by a discovery node of a distributed system; deploying a custom broker, by the discovery node, to connect to the sensor device, wherein the deploying of the custom broker is based on a common protocol of the custom broker and the sensor device; connecting the discovery node to the sensor device via the custom broker; reading, by the custom broker, data from the sensor device; onboarding the sensor device onto the distributed system, wherein the onboarding comprises mapping a unique sensor device identifier from the data to metadata associated with one or more applications on the distributed system; and adding sensor device data to a sensor device inventory on the distributed system, to represent the sensor device as a resource abstraction, wherein the resource abstraction can be instantiated as a service.

20 Claims, 9 Drawing Sheets

100

600

700

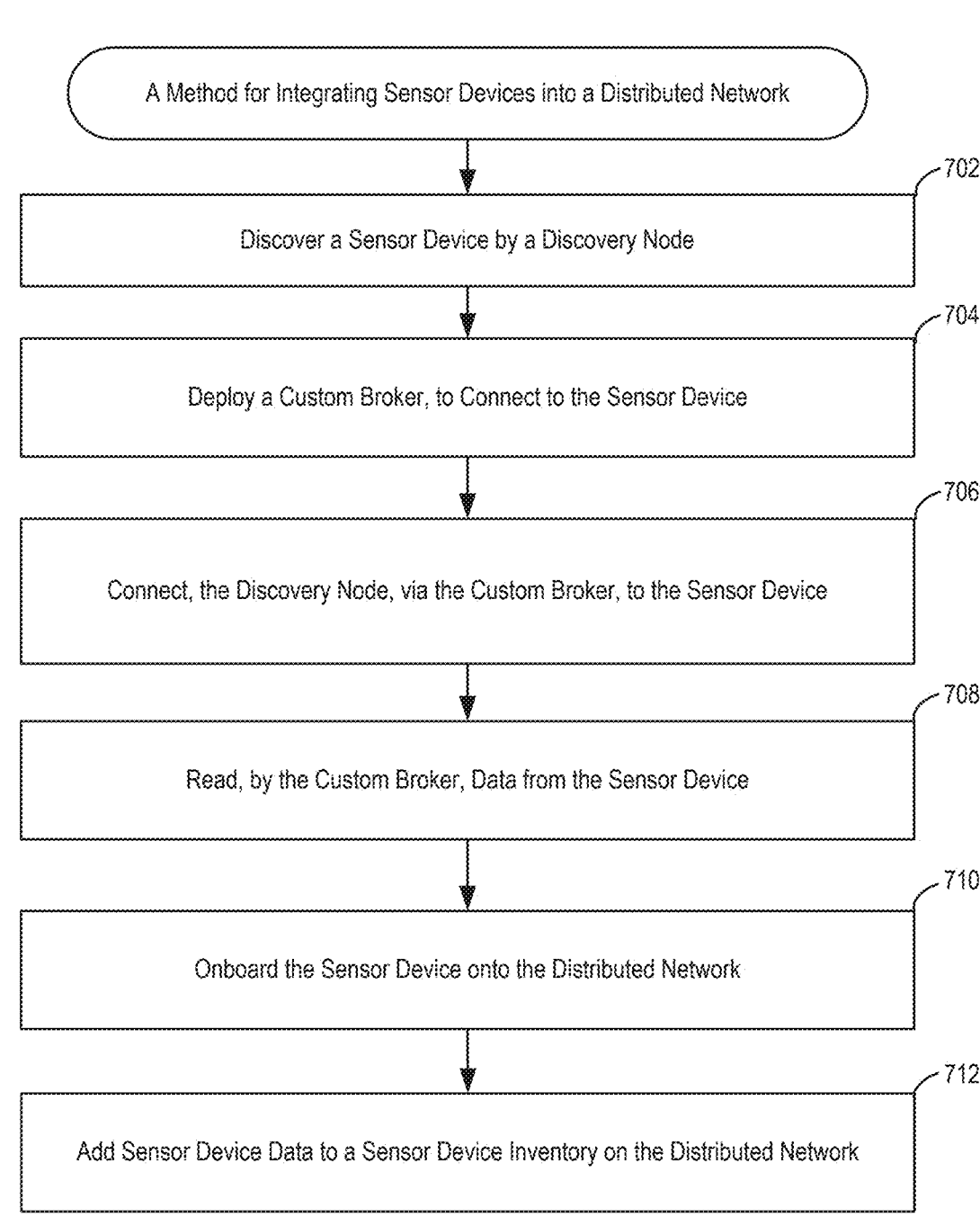

A Method for Integrating Sensor Devices into a Distributed Network

702

Discover a Sensor Device by a Discovery Node

704

Deploy a Custom Broker, to Connect to the Sensor Device

706

Connect, the Discovery Node, via the Custom Broker, to the Sensor Device

708

Read, by the Custom Broker, Data from the Sensor Device

710

Onboard the Sensor Device onto the Distributed Network

712

Add Sensor Device Data to a Sensor Device Inventory on the Distributed Network

A Method for Integrating Sensor Devices into a Distributed Network

802

Deploy a Custom Broker, to Connect to the Sensor Device

804

Read, by the Custom Broker, Data from the Sensor Device

806

Represent the Sensor Device as a Resource Abstraction

808

Reconfigure Settings of one or more Applications, to Replace the Sensor Device with a Second Sensor Device

DYNAMIC DISCOVERY AND DEPLOYMENT OF SENSORS AND LEAF DEVICES AS SERVICES IN A DISTRIBUTED ENVIRONMENT

BACKGROUND

Field

Aspects of the present disclosure relate to distributed systems, sensor technology, and integration of sensors in distributed and edge compute systems, and in particular, dynamic discovery and deployment of sensors and leaf devices as services in a distributed environment.

Description of Related Art

Distributed edge computing is a widely adopted form of distributed computing architecture that allows applications to run on multiple compute resources "at the edge", e.g., closer to sources of data being processed, for example, on local devices or edge servers, resulting in the compute load being distributed across multiple compute nodes, improving the scalability, reducing latency, saving bandwidth, and improving resiliency of the distributed system, among other benefits. Across various industries, distributed systems may deploy and rely on large numbers of sensors and sensor data, including in energy, agriculture, and manufacturing industries to help in monitoring, control, and automation process flows.

SUMMARY

One aspect provides a method comprising discovering a sensor device, over a connection, by a discovery node of a distributed system; deploying a custom broker, by the discovery node, to connect to the sensor device, wherein the deploying of the custom broker is based on a common protocol of the custom broker and the sensor device; connecting the discovery node to the sensor device via the custom broker; reading, by the custom broker, data from the sensor device; onboarding the sensor device onto the distributed system, wherein the onboarding comprises mapping a unique sensor device identifier from the data to metadata associated with one or more applications on the distributed system; and adding sensor device data to a sensor device inventory on the distributed system, to represent the sensor device as a resource abstraction, wherein the resource abstraction can be instantiated as a service.

One aspect provides a processing system, comprising a memory comprising computer-executable instructions; and a processor configured to execute the computer-executable instructions and cause the processing system to discover, over a connection, a sensor device by a discovery node of a distributed system; deploy a custom broker, by the discovery node, to connect to the sensor device, wherein deployment of the custom broker is based on a common protocol of the custom broker and the sensor device; connect, the discovery node, via the custom broker, to the sensor device; read, by the custom broker, data from the sensor device; onboard the sensor device onto the distributed system, wherein the onboarding comprises mapping a unique sensor device identifier from the data to metadata associated with one or more applications on the distributed system; and add sensor device data to a sensor device inventory on the distributed system, to represent the sensor device as a resource abstraction, wherein the resource abstraction can be instantiated as a service.

One aspect provides a method for integration and deployment of sensor devices as services in a distributed system, comprising deploying a custom broker, by a discovery node of a distributed system, to connect to a sensor device, wherein the deploying is based on a common protocol of the custom broker and the sensor device; reading, by the custom broker, data from the sensor device; representing the sensor device as a resource abstraction, wherein the resource abstraction can be instantiated as a service; and reconfiguring settings of one or more applications, to replace the sensor device associated with the one or more applications with a second sensor device, wherein the second sensor device is represented as a second resource abstraction instantiated as a second service.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 7 depicts another example method for integrating and deploying sensor devices into a distributed system.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
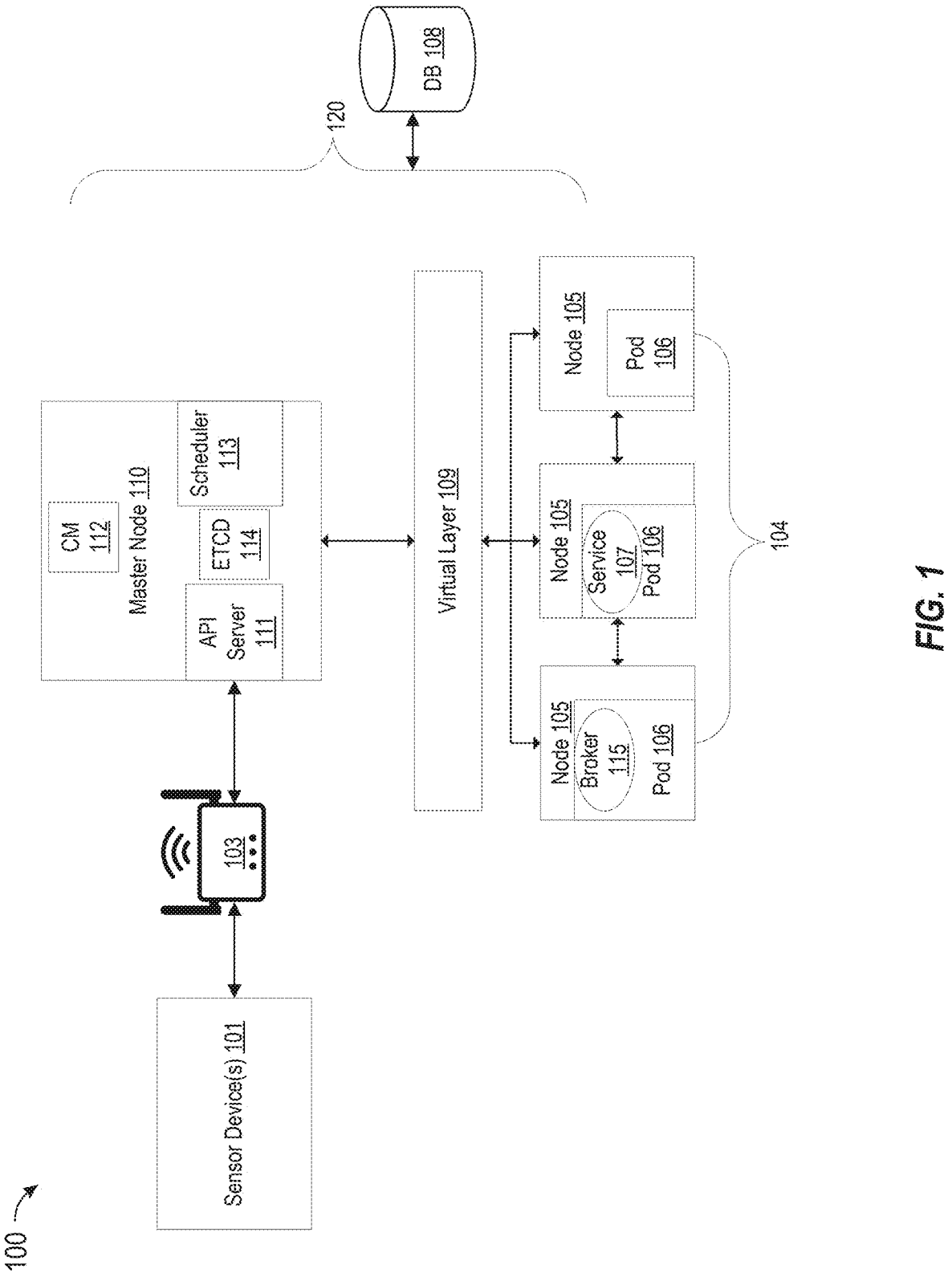
FIG. 1 depicts an example distributed system comprising sensor devices that are connected to and integrated with the distributed system, according to at least one aspect of the present disclosure.

Aspects of the present disclosure provide apparatuses, methods, processing systems, and computer-readable mediums for incorporating sensors and other leaf devices (referred to interchangeably and collectively herein as "sensor device(s)") into distributed systems and networks or the orchestration systems used to manage them (these all referred to herein collectively and interchangeably as "distributed system"). The disclosed apparatuses, methods, systems, and computer-readable mediums facilitate this by utilizing broker modules (referred to herein as "custom brokers") to allow distributed system, including those utilizing edge computing, to seamlessly integrate and deploy various types of sensors and leaf devices via the custom brokers.

Edge computing, a form of distributed computing architecture for distributed systems, may rely on data received at the edge (e.g., data generally received from locations physically close to data processing centers) from various sensors, leaf devices (a device working with the distributed system), and compute nodes. However, to improve the efficiency of a distributed system utilizing edge computing, it may be important for devices at the edge to be able to be added to, removed from, and configured on the distributed system in a timely and efficient manner so that applications on the distributed system may access these sensor devices and process the data they generate as fast as possible for various application process flows of the distributed system. However, adding, removing, and modifying sensors on distributed systems can be difficult, requiring onerous manual configurations and lengthy installation processes for each new sensor device to allow it and its data to be accessed and utilized by the various applications on the distributed system. This may be problematic in dynamic environments where sensors need to be added, replaced or modified immediately and in response to contextual factors or events.

The primary technical impediment to the seamless addition, integration, and use of sensor devices in distributed systems may be due to sensors using different protocols based on their hardware and software components. Therefore, whenever a new device is added, specific protocols and installation processes have to exist or be available to the distributed system.

Furthermore, in distributed systems relying on edge architecture, sensor devices are usually directly connected to the edge computer, gateway, or server that runs the application that makes use of the sensor data, and that limits their use to that one application. Sensor and other leaf devices are generally too computationally small to be added independently as a node to a distributed system to allow them to be used across the distributed system by other applications. Therefore, there is a need to not only be able to dynamically and seamlessly add and integrate sensor and other leaf devices to distributed systems, but also to expand the use of such devices across the distributed system by making them usable as a resource by multiple applications of the distributed system.

Aspects described herein provide a technical solution to these problems by allowing the seamless addition of devices and sensors at scale and facilitate the use of sensor and leaf devices as resources that can be instantiated and deployed as services by various applications across the distributed system. Aspects described provide for the dynamic discovery, integration, and utilization of heterogeneous sensor devices.

Aspects described include a technical solution comprising the deployment of universal sensor brokers that can interact with various types of sensor devices including I2C and SPI types, allowing for the dynamic discovery and integration of these sensor devices into the distributed system. The use of these brokers is results in the dynamic appearance and disappearance of sensors (i.e., plug and play) to nodes and applications of the distributed system, eliminating the need to manually configure or install each sensor.

Aspects described also provide a technical solution by providing sensor device(s) as service(s)/micro-service(s) or as resources that can be instantiated as service(s). This allows the sensor device(s) added into the distributed system to be used by several applications across various nodes of the distributed system simultaneously. As a non-limiting example, the distributed system can run several different separate computer vision inference applications (such as object detection, image segmentation, pose estimation etc.) on the same camera service created out of a camera (sensor).

One advantage of the aspects described is to allow seamless addition and integration of sensor devices immediately and without requiring lengthy, manual or custom installation of different protocols to incorporate each sensor device into the distributed system. As soon as a sensor is added to the system it is presented as a service or as a resource that can be called as a service that is usable and deployable by any application or node on the distributed system.

Another advantage of the aspects described is that using a custom broker allows for a universal solution that facilitates scalability since any sensor device can be added to the distributed system without additional or device-specific configuration or customization. This makes adding, configuring, and utilizing most industrial sensors scalable.

A further advantage of the aspects described herein is that the resiliency of a distributed system is greatly improved. This is because the resiliency of the system will not rely on a finite number of installed and integrated sensors, instead, a downed sensor can be immediately replaced by other sensors, either by activating and adding new sensors to the distributed system as needed, or by activating sensors that are already available as resources or services on the distributed system, or transferring them from low priority applications to high priority applications.

A further technical advantage includes additional manipulations, customizations, and programming of sensor devices when exposed to the distributed system as services. Sensor devices can be used by multiple different applications at once. This is one of the advantages of virtualizing sensor device(s) as services. Virtualizing sensor device(s) as services also increases the usability and flexibility of sensor devices allowing them to be deployed in various use cases that would ordinarily not be possible. In one non-limiting example, artificial intelligence ("AI") workflow pipelines can make use of these sensor service(s) to run AI powered applications at the edge, since the aspects described make input data streams from sensor devices readily available to AI applications in distributed systems.

Example Distributed System Integrating a Sensor Device

FIG. 1 depicts an example of a distributed system 100 comprising sensor device(s) 101 connected to and integrated with the distributed system 100, according to at least one aspect of the present disclosure.

The distributed system 100 includes sensor device(s) 101. The sensor device(s) 101 can be of various types including a temperature sensor, a proximity sensor, an infrared sensor, a light sensor, a smoke sensor, an Internet of Things ("IoT") sensor, a pollution sensor, a Radio Frequency Identification Reader ("RFID") sensor, an image sensor, a biometric sensor, a printed sensor, a micro-electric mechanical systems ("MEMS") sensor, or a nano-electro-mechanical systems ("NEMS") sensor. The sensor device(s) 101 can also utilize or comprise one or more communication protocols including and not limited to Inter-Integrated circuit ("I2C"), Serial Peripheral Interface ("SPI"), Universal Asynchronous Receiver-Transmitter ("UART"), Controller Area Network ("CAN"), MODBUS, Bluetooth, Zigbee, or LoRaWAN.

The distributed system 100 also includes network access point(s) 103 (e.g., wired or wireless access points). The access point(s) 103 can include or be edge node(s) located at the physical edge of a network. An edge node acts as a gateway or bridge between networks, e.g., between local internal network(s) and external network(s). The access point(s) 103 allow a connection of the sensor device(s) 101 to nodes of the distributed system 100. In this example, the distributed system is made up of various nodes 105 that may be organized into cluster(s) 104 managed by an orchestration system 120. Each node 105 can instantiate pod(s) 106 that run application containers and service(s) 107 representing the sensor device(s) 101. Additionally, the distributed system has access to database(s) 108 to store and manage data. The pod(s) 106 also include custom broker(s) 115 that may manage sensor device(s) 101, or connect and onboard the sensor device(s) 101 onto the distributed system to expose them as service(s), e.g., service(s) 107, or as abstracted resource(s) that can be called or activated as service(s).

In some aspects, the custom broker(s) 115 may, for example, be universal type custom broker(s) that comprise mechanisms to connect to various sensors of the same type. For example, a universal camera sensor broker, designed to connect to, or onboard different types of cameras (USB cameras, IP cameras) wherein the custom broker(s) is able to handle the different type of cameras. A "type" of sensor may be a broad grouping, e.g., a "camera type", comprising various smaller types, made up of smaller groupings of webcams, USB cameras, and IP cameras. In these instances, the sensor device 101 may discover a camera with specific discovery details identifying it as a "camera type" sensor, and the custom broker(s) 115 may be deployed based on information about the discovered sensor, which may be retrieved from a sensor inventory, or in combination with the discovery details retrieved from the sensor itself.

In some aspects, even if the custom broker(s) 115 are not universal type custom broker(s), it may be possible that multiple yet different types of sensors that use the same protocol might be able to use the same custom broker(s) depending on how the custom broker(s) are initiated. For example, two sensor devices 101 that use a Universal Asynchronous Receiver-Transmitter (UART) as a protocol and that only differ in their baud rate may utilize the same custom broker(s) 115. In this case, the same custom broker(s) may be deployed for these two sensors, and the baud rate may be passed as an environment variable/parameter in a container or the pod 106 in which the custom broker 115 runs.

Aspects described herein allow the sensor device(s) 101 to be represented and be accessible to the nodes 105 of the cluster 104 as one or more abstracted services (e.g., 107) representative of capabilities of the sensor device(s) 101. These service(s) may beneficially be utilized like any other service by the pod(s) 106. This allows the cluster(s) 104 and the larger distributed system 100 to interact with and deploy the sensor device(s) 101 as service(s) 107.

Aspects described herein thus extend the capabilities of an orchestration system, (e.g., 120) to the sensor device(s) (e.g., 101) and allow static or dynamic exploitation of such sensor device(s) 101 once integrated into the distributed system 100. The orchestration system 120's architecture includes a master node 110, multiple worker nodes (e.g., the nodes 105), as well as a virtual layer 109 that unifies the nodes 105 and facilitates communications between them and the master node 110. The master node 110 can include a controller manager ("CM") 112 that controls the cluster 104 and keeps track of the nodes 105 and their application containers, a scheduler module 113 that schedules application containers for each node 105, and an API server 111 that acts as an entry point of communication with the master node 110, e.g., communication from the robotic platform 101 via the API access point 111 to the master node 110. The master node 110 may also include a primary data store such as ETCD 114, which is a distributed, consistent key-value store for shared configuration, service discovery, and coordination.

Once the sensor device(s) 101 has been exposed to the cluster 104, its data representation may be saved, e.g., in database 108 or ETCD 114, for later retrieval and instantiation. By exposing the sensor device(s) 101 capabilities in terms of abstracted services (in some aspects via declarative definitions), the sensor device(s) 101 can be made available on the node(s) 105 of the cluster 104 just like any other compute resource, e.g., by being instantiated as the service(s) 107. By way of example, if a workflow requires the sensor device(s) 101 to carry out a task at a specific location, such as sensing or collecting data at the location, then the orchestration system 120 can instantiate the service(s) 107 representing the sensor device(s) 101 on the node(s) 105 to undertake the task, where the master node 110 would provide the service(s) 107 with instructions resulting in the task being carried out by the sensor device(s) 101.

Example Methods Incorporating Sensor Devices
onto a Distributed System

Figure 2:
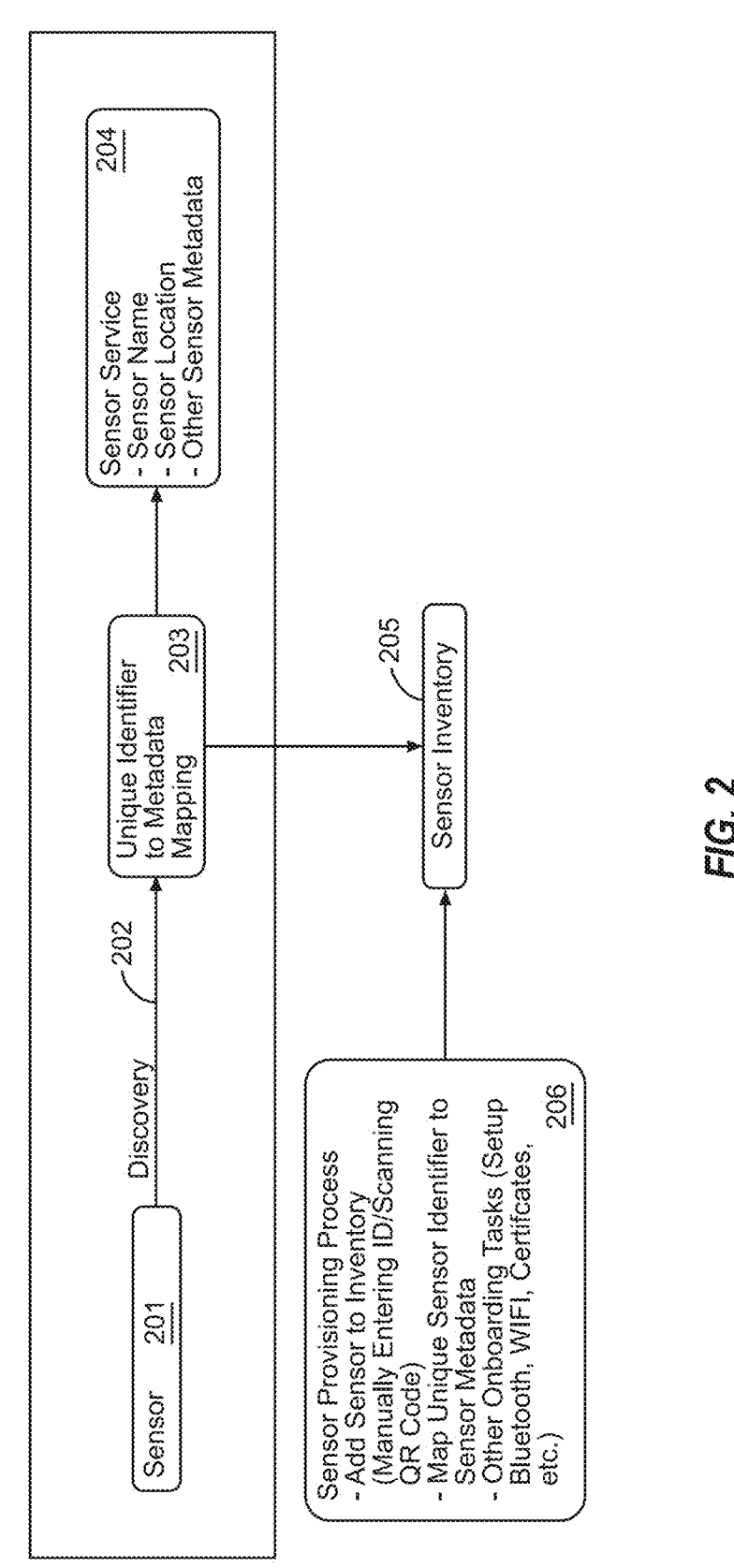
FIG. 2 depicts an example method to provision a sensor device onto a distributed system, according to at least one aspect of the present disclosure.

FIG. 2 depicts an example method 200 to provision a sensor device 201 onto a distributed system, e.g., the distributed system 100, FIG. 1, according to at least one aspect of the present disclosure.

Method 200 begins by sensor device(s) 201, e.g., the sensor device(s) 101, FIG. 1 being discovered 202 by a distributed system. Upon discovering 202 of the sensor device(s) 201, the method 200 then maps 203 a unique identifier (referred to herein as "UID") of the sensor device(s) 201 to metadata assigned to the sensor device(s) 201, for example in associated databases or applications that would utilize the sensor device(s) 201. The mapped metadata can then be used by service(s) 204, e.g., the service 107, FIG. 1, for example to associate the service(s) 204 to the sensor device(s) 201, where the service(s) 204 may be run directly by one or more applications/containers or be run or deployed on a pod independently from other applications, e.g., the pod(s) 106, FIG. 1. The metadata can include the sensor name, location, make, model, serial number, software version, etc. The UID may also be added to a sensor inventory 205 which may include additional sensor related data from other inputs or other onboarding tasks 206, that can comprise manually entered identifiers or scanned data from a code such as a QR code or barcode, security certificates, setup configurations of various components of the sensor device(s) 201 such as Wi-Fi, Bluetooth, and the like. In some aspects, during onboarding tasks 206, custom broker(s) settings or details for sensor device(s) 201 may be specified. When the sensor device(s) 201 is discovered 202 the relevant custom broker(s) may then be assigned based on those details.

The sensor inventory may contain the configurations used to activate or maintain each sensor device 201 and its related functionalities on the distributed system.

Figure 3:
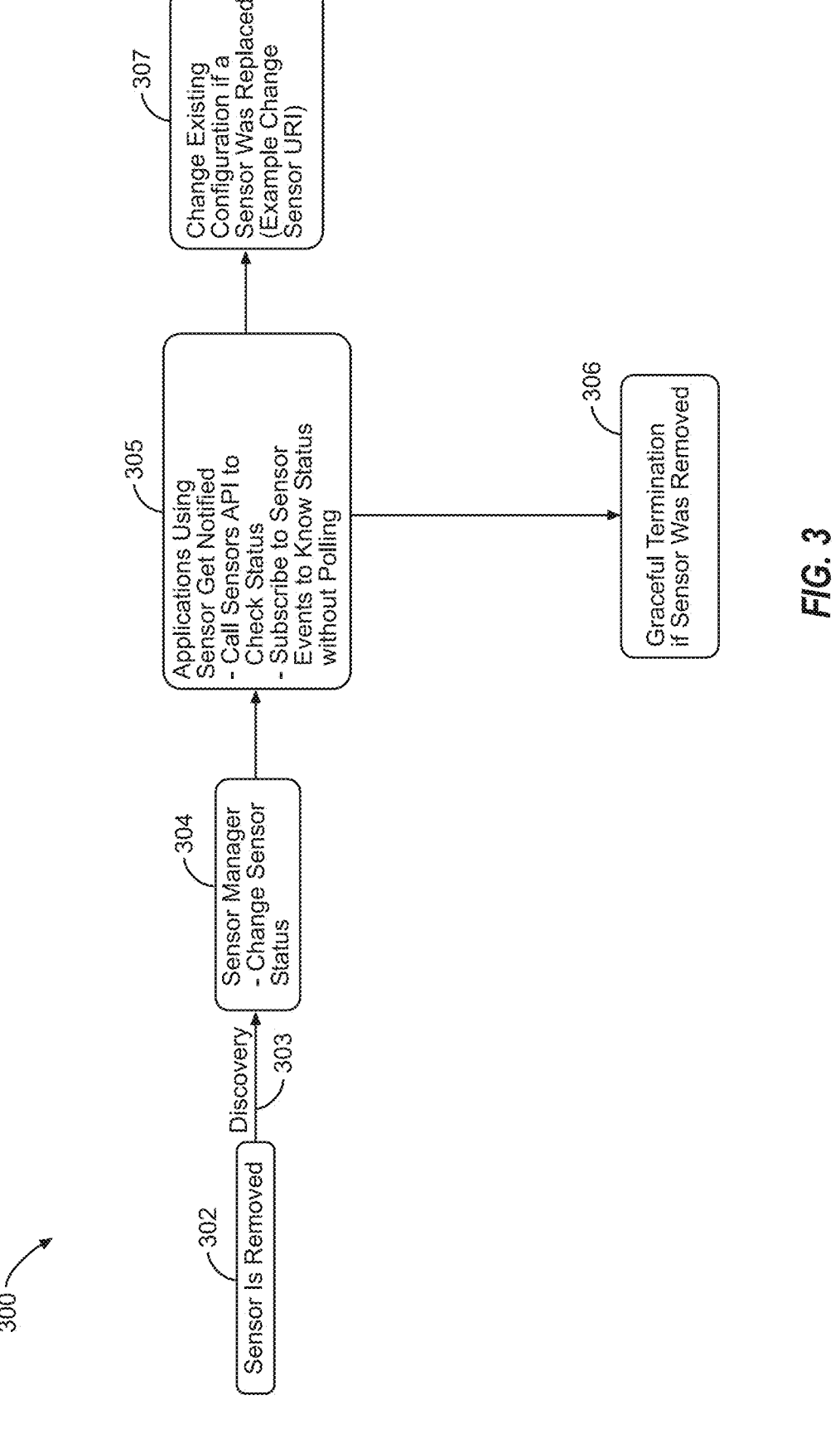
FIG. 3 depicts an example method to remove a sensor device from a distributed system, according to at least one aspect of the present disclosure.

FIG. 3 depicts an example method 300 to remove sensor device(s) from a distributed system, according to at least one aspect of the present disclosure.

Method 300 begins by the removal 302 of a sensor device, e.g., the sensor device(s) 101, FIG. 1, 201, FIG. 2. This could include physical removal or deactivation of the device(s), or digital deactivation of the device from a distributed system, e.g., the distributed system 100, FIG. 1.

Method 300 then includes discovery 303 by at least one component of the distributed system of this removal 302, whereupon a sensor manager can change or alter 304 a status of the sensor device on the distributed system, for example in a status log.

One or more applications are then notified 305 that the sensor status has changed, wherein the notification may automatically be triggered by the change in status, and in aspects are either prompted to undertake actions, or independently upon the notification undertake actions in response to this notification. Examples of possible actions include and are not limited to calling the sensor device's API to confirm or check its status, or subscribing to events published by the sensor device(s) or its associated service(s), to be notified of the sensor device(s) status, by the sensor device(s) or its associated service. If the applications using the sensor device(s) confirm disconnection of the sensor device(s), either via the APIs or via subscribe and publish events, then the applications either terminate 306 the sensor device(s) or service(s) associated with the sensor device(s).

In some aspects, the applications of the distributed system may reconfigure 307 settings of the one or more applications, to replace the sensor device(s) associated with the one or more applications with at least one replacement sensor device or service. The reconfiguration 307 may be based on a detection of the at least one replacement sensor device(s) (or its associated service). Detection of a replacement sensor device(s) could occur, for example, by detecting a new UID or other sensor data or metadata.

Figure 4:
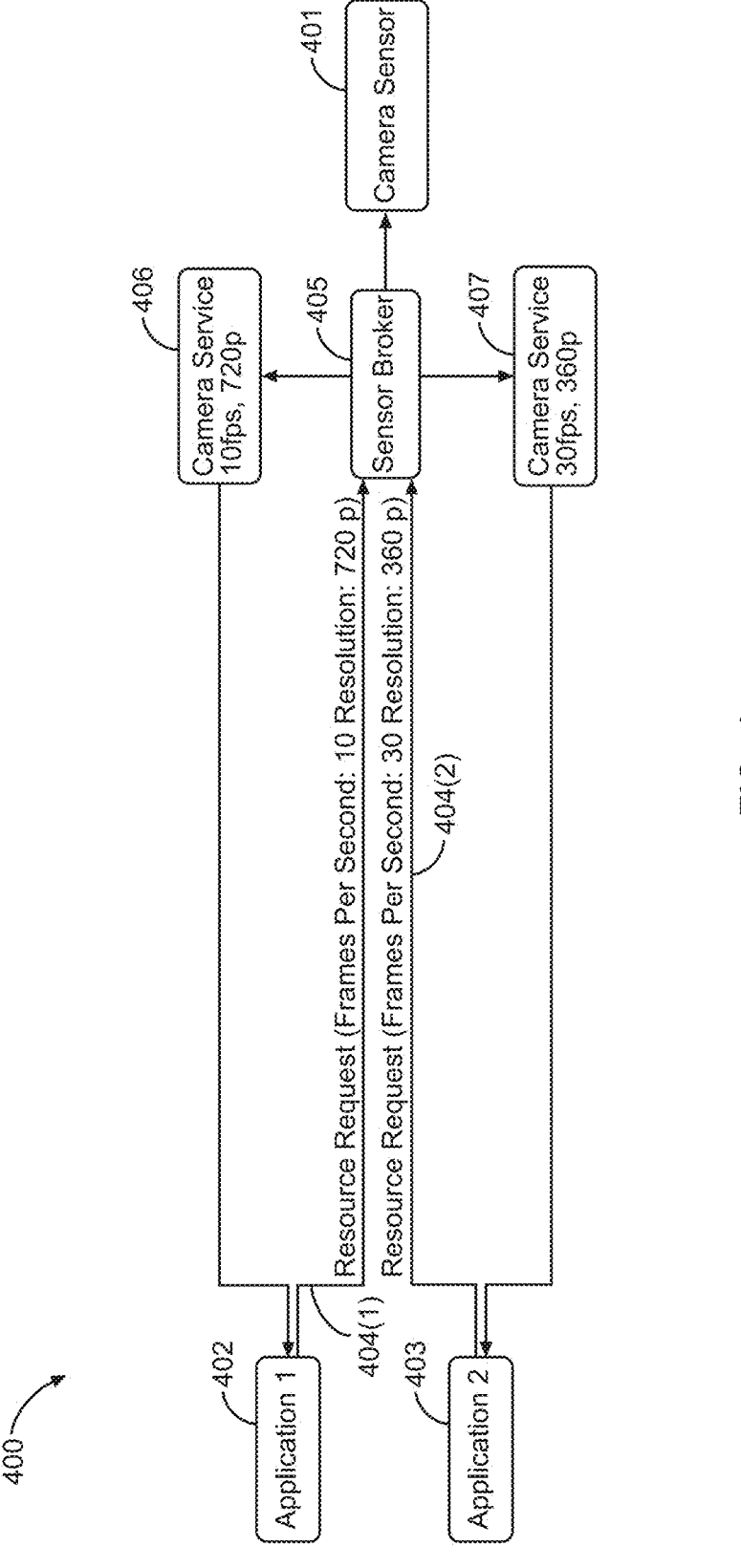
FIG. 4 depicts an example method to utilize a sensor device as a service on a distributed system, according to at least one aspect of the present disclosure.

FIG. 4 depicts an example method 400 to utilize sensor device(s) as a service on a distributed system, e.g., the distributed system 100, FIG. 1, according to at least one aspect of the present disclosure.

One or more applications, e.g., application 402 and application 403 running on the distributed system may issue one or more resource requests 404(1), 404(2) for a sensor device(s), e.g., sensor device(s) 101, FIG. 1, or for service(s) associated with the sensor device(s), e.g., the service(s) 107, FIG. 1. The resource request(s) 404(1), 404(2) can be issued to a broker(s) 405. The broker(s) 405 may manage sensor device(s) or their associated services on the distributed system. In some aspects, the broker(s) 405 may be responsible for receiving data streams, For example receiving image frames from a sensor device 401 e.g., a camera, or exposing endpoint(s) for application(s), e.g. the applications 402, 403, to process the image frames. In some aspects, the broker(s) 405 are custom broker(s), e.g., custom broker(s)

115, FIG. 1. In some aspects, the broker(s) 405, are distinguishable and separate from the broker(s) used for initial connection and onboarding of a sensor device. For example, the broker(s) 405 may be different to the broker(s) 115, FIG. 1 and unlike the broker(s) 115 that are used for initial connection and onboarding of sensor device(s), the broker(s) 405 may be custom broker(s) active only post-connection and onboarding.

Once the broker(s) 405 receives the resource request(s) 404(1), 404(2), it can take a number of actions, wake, activate, or instantiate service(s) of the sensor device(s). The service(s) can be associated with an application, e.g., service 406 associated with application 402, or service 407, associated with application 403, check the status of the sensor device 401 or other devices to determine availability, or act as a connection or facilitator of instructions or data between the one or more applications, the services, or the sensor device(s) 401. A sensor service 407 associated with a sensor device 401 can be used by multiple different applications at once. This is one of the advantages of virtualizing sensor device(s) as services. The service(s) 406, 407, after being activated or instantiated by the broker(s) 405 may then in aspects be able to directly interact with the associated applications 402, 403, but may still require the broker(s) 405 to interact with the sensor device 401. In aspects, the broker(s) 405 is a custom broker(s) used to initially onboard the sensor device onto the distributed system, e.g., broker(s) 115, FIG. 1.

In some aspects, the broker(s) 405 may be specific to a sensor or sensor type. In some aspects, the node, e.g., the node(s) 105, FIG. 1, or an edge node such as access point 103, FIG. 1, that the broker(s) 405 may run on may depend on where or what the sensor, e.g., the sensor device 401 is connected to. For example, the broker(s) 405 could be a custom broker(s) that could, for example, read frames from a sensor device 401 that is a USB webcam and expose endpoints for applications in different resolutions.

For example, in the case of a USB webcam, the broker(s) 405 may run on the node in which the USB webcam is connected. If, however, the broker(s) 405 was associated with a different type of sensor device 401, e.g., an IP camera connected to the same network where the nodes are connected, it may not matter where the broker(s) runs (since it could run on any node as long as the node can somehow connect to the sensor device 401, e.g., the IP camera). For instance, when the broker(s) 405 is an IP camera broker(s), it may utilize different protocols in comparison to a broker(s) 405 that is a USB webcam broker(s). For example, in the case of an IP camera, the broker(s) 405 may possess relevant mechanisms to read frames from an IP camera, e.g. where the IP camera exposes streams via an Open Network Video Interface Forum (ONVIF) protocol or another protocol.

Figure 5:
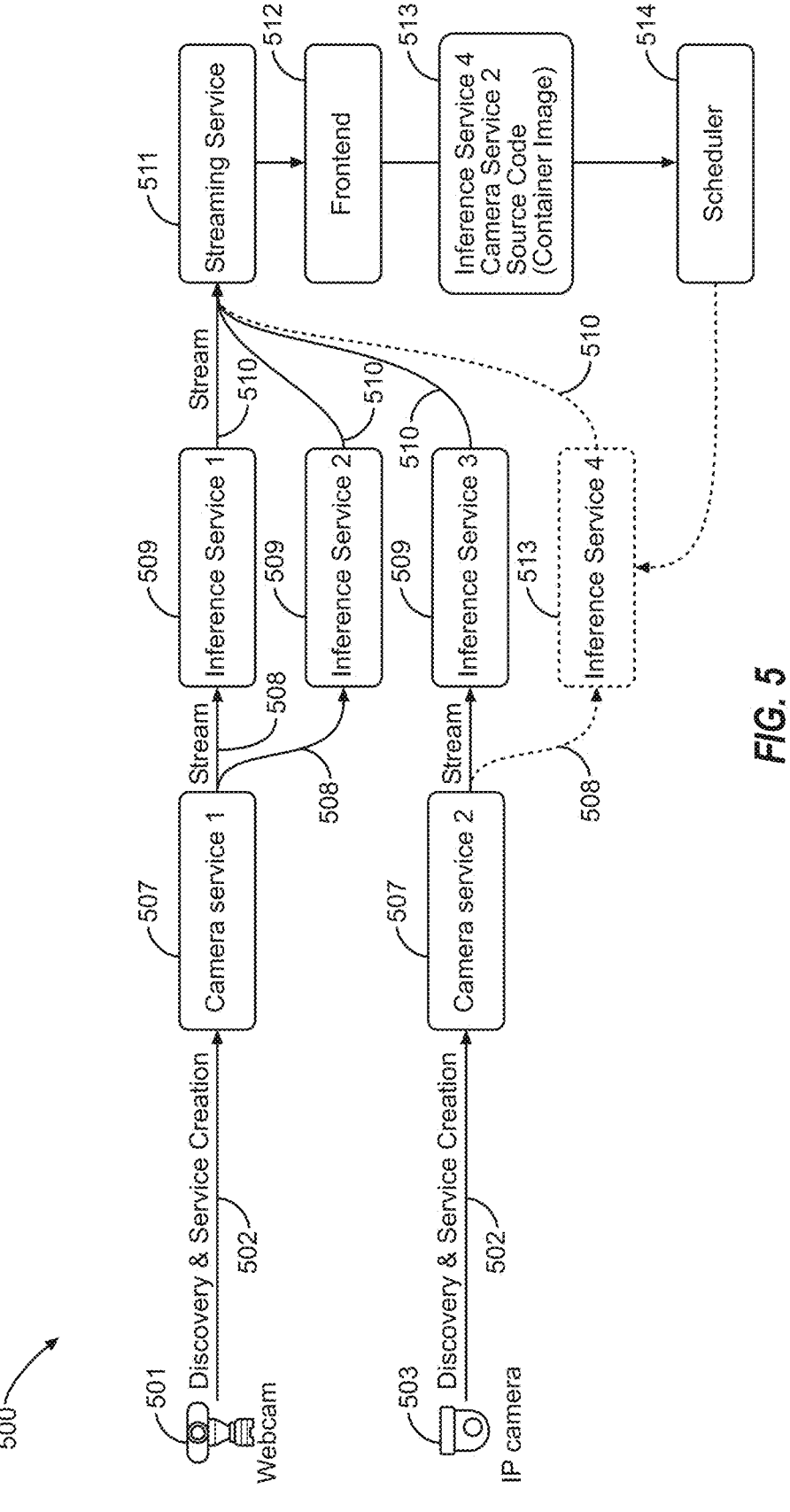
FIG. 5 depicts an example method to autonomously generate applications utilizing sensor devices as a service on a distributed system, according to at least one aspect of the present disclosure.

FIG. 5 depicts an example method 500 to autonomously generate applications utilizing sensor devices as a service using artificial intelligence and machine learning models on a distributed system, e.g., the distributed system 100, FIG. 1, according to at least one aspect of the present disclosure. Method 500 comprises provisioning 502 sensor device services 507 e.g., service(s) 107, FIG. 1 from sensor device(s) 501, e.g., sensor device(s) 101, FIG. 1. The provisioning 502 can include provisioning processes of method 200, FIG. 2, including described discovery and service creation processes. Once service(s) 507 for the sensor device(s) 501 are created or maintained on the distributed system, these service(s) 507 generate inference data stream(s) 508.

The inference data stream(s) 508 are then input into a multi-modality store of a multi-modal machine learning/

Artificial intelligence ("AI") model(s) to generate at least one inference service 509. The multi modal AI models produce output streams/inference outputs 510 that are then used as inputs to generate new applications and services 511 dynamically, based on the inference data streams, the sensors and the machine learning/AI model used. The dynamic services 511 may also include a front end user interface (UI) 512, which may also be generated by the inference service(s) 509. Additional inference service(s) 513 can also be deployed at various stages of this method 500. For example, an additional inference service 513 can be created, which may rely on data from different sensor device(s) 503, and which may generate different results or outputs that can be utilized by the dynamic service 511. All these various streams of data can also feed into scheduler software 514 that provides feedback and instructions to the inference service(s) 509 or additional inference service(s) 513

In one non-limiting example, the sensor device(s) 501 may comprise a number of visual sensors and cameras, for example a webcam showing a person sitting at a desk, which then is instantiated as camera service(s) 507 running on the distributed system, and generating live video streaming data 508. This streaming data 508 is fed into one or more machine learning model(s) in inference service(s) 509. Inference output data 510 which can be combined to generate a new application or dynamic service 511 such as a video streaming service based on the determined type of streaming data 508, the type of sensors, and any provided instructions. In some aspects, application or dynamic service 511 may comprise a frontend user interface (UI) 512 comprising a video player. The application or dynamic service 511 may combine with other data streams or inference outputs, for example, with data streams from ancillary inference service(s) 513 that use streams from different sensor device(s) 503 (or different machine learning models), e.g., a camera placed elsewhere providing a different angle of the person sitting at their desk. The image data from the other sensor device(s) 503, may for example be used to provide image augmentation or visual improvements to the inference outputs produced from the data of the sensor device(s) 501 as displayed on the frontend UI 512. All this data may be fed into a scheduler 514 that provides feedback and instructions to the various inference services from the various sensor devices to generate data for the dynamic service(s) created.

Figure 6:
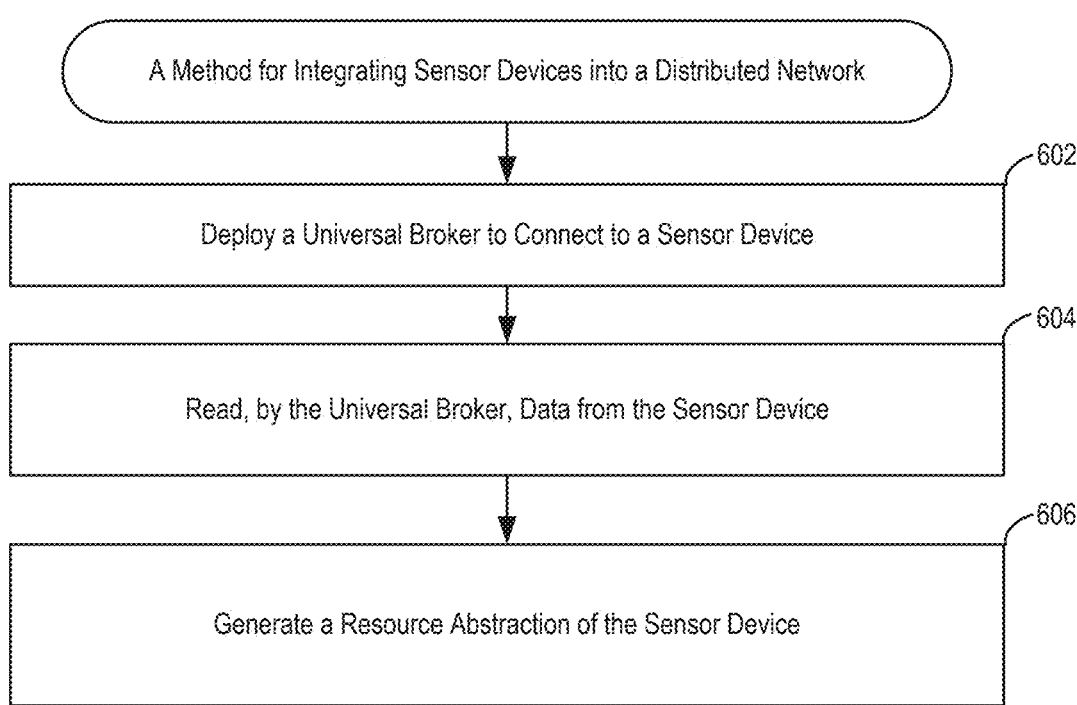
FIG. 6 depicts an example method for integrating and deploying sensor devices into a distributed system.

FIG. 6 depicts an example method 600 for integrating and deploying sensor device(s) into a distributed system, e.g., the distributed system 100, FIG. 1, according to at least one aspect of the present disclosure.

Method 600 begins by deploying 602 a custom broker(s), e.g., custom broker(s) 115, FIG. 1, by a discovery node of a distributed system, e.g., node(s) 105, or access point(s) 103, FIG. 1, to connect to sensor device(s), e.g. the sensor device(s) 101, FIG. 1. In some aspects, the deploying 602 is based on a common protocol of the custom broker(s) and the sensor device. This may include initial recognition of the protocol (or an interface) used by the sensor device(s) by the discovery node, and selection or deployment of a suitable custom broker(s) based on the protocol (or interface). In some aspects, the deploying 602 of the custom broker(s) includes selecting the custom broker(s) by the distributed system, based on a common protocol, the protocol being common between the custom broker(s) and the specific sensor device(s), or based on an interface of the sensor device that may determine the custom broker(s) to be selected or deployed. In some aspects, there are multiple custom broker(s) that can be selected and the broker(s) of the sensor device(s) determine which custom broker(s) are deployed 602 based on at least one of the common protocol or the interface.

Method 600 then proceeds with reading 604, by the custom broker(s), data from the sensor device(s). The data could include information about the sensor device(s) e.g., a UID, serial number(s), or protocol(s) the sensor device uses or is capable of utilizing, registration data, or configuration data.

Method 600 then proceeds to generating 606 a resource abstraction of the sensor device(s), wherein the resource abstraction can be instantiated as a service(s). The resource abstraction can for example be a data object or data class with certain attributes. In aspects, the generating 606 includes at least one of mapping a UID from the data to metadata associated with one or more applications on the distributed system, or adding sensor device data to a sensor device inventory on the distributed system. Generating 606 the resource abstraction may therefore include any of the steps described in method 200, FIG. 2. The resource abstraction may then be instantiated as a service on the distributed system.

Any or all of the described processes of method 600 may be combined with or incorporated into any processes from methods 200-500 FIGS. 2-5.

FIG. 7 depicts another example method 700 for integrating and deploying sensor devices into a distributed system, e.g., the distributed system 100, FIG. 1, according to at least one aspect of the present disclosure.

Method 700 begins with discovering 702 a sensor device, e.g., sensor device(s) 101, FIG. 1, for example by a discovery node of a distributed system, e.g., node 105, FIG. 1, or an edge node such as access point 103, FIG. 1. The discovering 702 could occur over a connection, which may be a physical connection, e.g., over Ethernet, or a wireless connection that could comprise at least one of Wi-Fi, Bluetooth, a ZigBee network, Radio Frequency identification (RFID), Long range wireless connectivity (LoRa), or Near-Field communication (NFC).

In aspects, method 700 continues with deploying 704 a custom broker(s), e.g., the custom broker(s) 115, FIG. 1, by the discovery node, to connect to the sensor device. In some aspects, the custom broker(s) may be deployed in a new pod, e.g., pods 106, FIG. 1. In some aspects, the custom broker(s) is deployed on a discovery node, e.g., access point 103, FIG. 1, or at least one of node(s) 105, FIG. 1. In some aspects, if a physical sensor is attached to a node, then the broker(s) may be deployed on that same node. In some aspects, for sensors that are directly connected to the network, the broker(s) may be deployed on any node. In some aspects, the deploying 704 of the custom broker(s) is based on a common protocol of the custom broker(s) and the sensor device. In aspects, the common protocol between the custom broker(s) and the sensor device determines the custom broker(s) that is deployed 704. In some aspects, a broker(s) can deploy any protocol of potentially multiple protocols implemented onto the broker(s). In some aspects, the method 700 can for example further comprise selecting, by the discovery node, the custom broker(s) based on at least one of the common protocol, or an interface of the sensor device.

Method 700 then proceeds to connecting 706 the discovery node to the sensor device via the custom broker(s). In aspects, the method 700 may, based on the discovering 702, also deploy a pod in the discovery node, wherein the custom broker(s) is instantiated or called into deploying a pod in the discovery node, for example pod 106, FIG. 1, wherein the pod is used for the deployment 704 of the custom broker(s).

In these instances, the sensor device is connected to the custom broker(s) in the deployed pod of the discovery node.

After connecting 706, method 700 can continue to read 708, by the custom broker(s), data from the sensor device. This data can comprise a UID or other identifier or configuration data, which in aspects can be from a scanned code such as a barcode or QR code.

Method 700 continues to onboard 710 the sensor device onto the distributed system, wherein the onboarding comprises mapping the UID from the data that was read 708 to metadata associated with one or more applications on the distributed system. The mapping allows the one or more applications on the distributed system to have access to the sensor device Method 700 also comprises, adding 712 sensor device data to a sensor device inventory on the distributed system, to represent the sensor device as a resource abstraction, wherein the resource abstraction can be instantiated as a service, e.g., the service 107, FIG. 1. In aspects, the resource abstraction can be a data class or object that is saved in the repository of the distributed system and can be called as a service by one or more applications of the distributed system.

Method 700 and any or all its described processes may be combined with any processes from methods 200-600 FIGS. 2-6.

Figure 8:
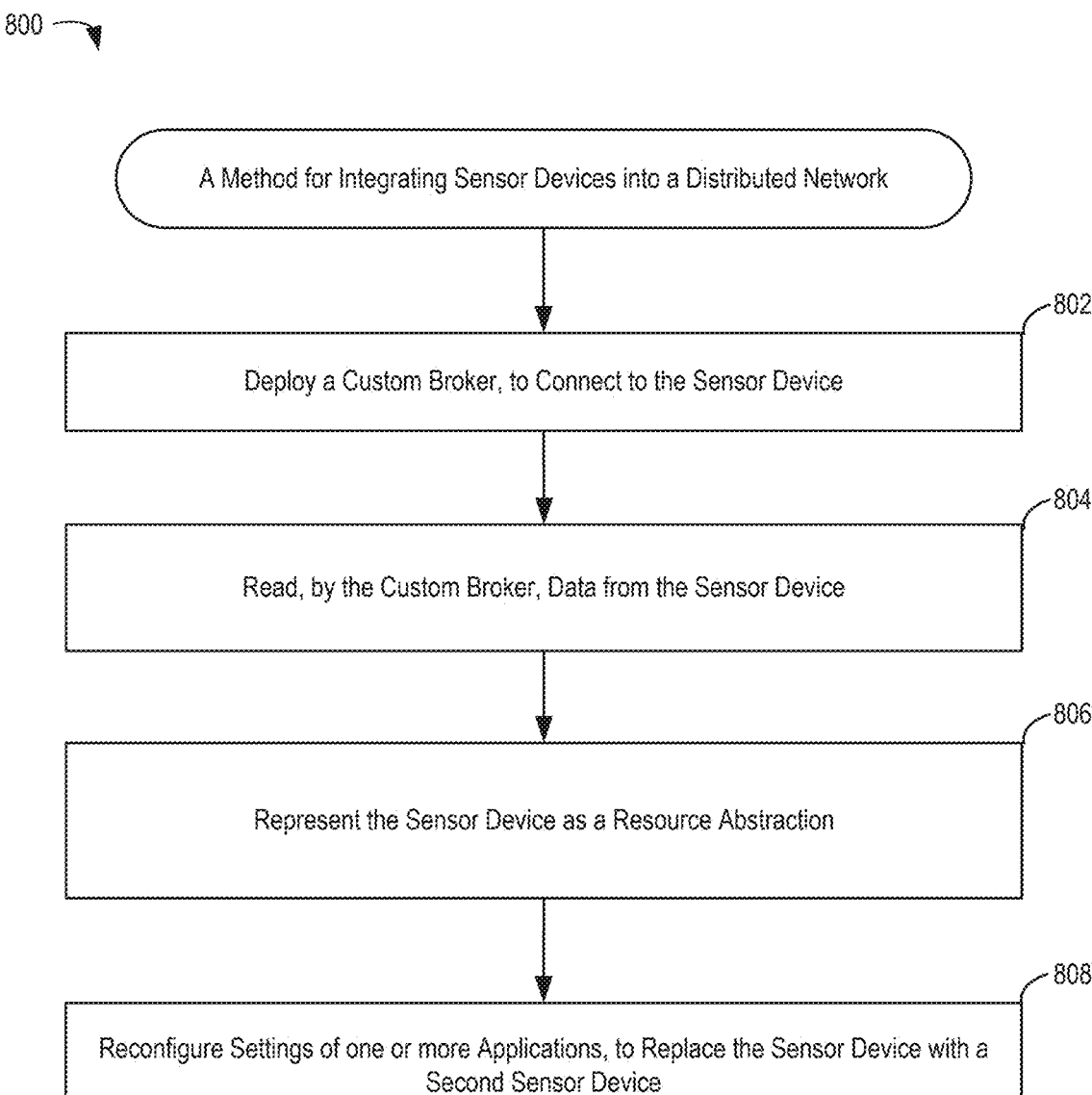
FIG. 8 depicts an example method for representing a sensor device as a resource abstraction in a distributed system

FIG. 8 depicts an example method 800 for representing a sensor device as a resource abstraction in a distributed system. In some aspects, the method 800 begins by deploying at 802 a custom broker, e.g., the custom broker(s) 115, FIG. 1, by the discovery node, to connect to the sensor device e.g., sensor device(s) 101, FIG. 1, for example by a discovery node of a distributed system, e.g., node 105, FIG. 1. In some aspects, the deploying may be based on a common protocol between the custom broker and the sensor device.

In some aspects, the method 800 continues at 804 with reading, by the custom broker, data from the sensor device. The data read may comprise a UID, another identifier, or configuration data, which in aspects may be triggered by a scanned code such as a barcode or QR code.

In some aspects, the method 800 continues with representing the sensor device as a resource abstraction at 806, wherein the resource abstraction can be instantiated as a service. The representing at 806 of the sensor device as an abstraction may include at least one of mapping a unique sensor device identifier from the data to metadata associated with one or more applications on the distributed system, or adding sensor device data to a sensor device inventory on the distributed system. For example mapping the unique sensor identifier may correspond to the unique identifier to metadata mapping at 203, FIG. 2.

Method 800 may also include at 808, reconfiguring settings of one or more applications, at 808, to replace the sensor device associated with the one or more applications with a second sensor device, wherein the second sensor device is represented as a second resource abstraction instantiated as a second service. For example, the reconfiguring of the settings may correspond with 307, FIG. 3.

Method 800 and any or all its described processes may be combined with any processes from methods 200-700 FIGS. 2-7.

Figure 9:
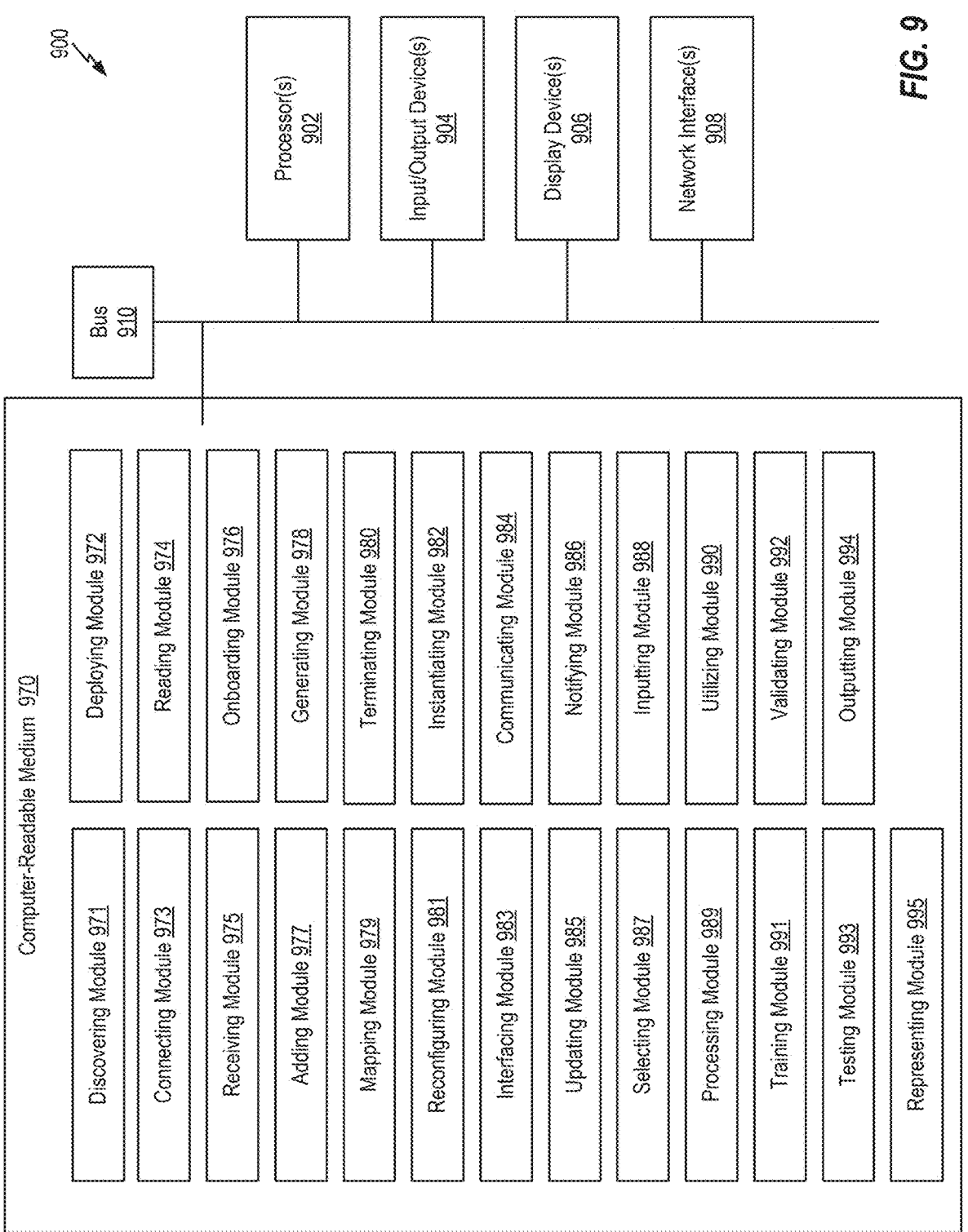
FIG. 9 depicts an example processing system with which aspects of the present disclosure can be performed, according to at least one aspect of the present disclosure.

Example Processing System for Integration and Deployment of Sensor Devices as Services in a Distributed System FIG. 9 depicts an example processing system 900 configured to perform various aspects described herein, including, for example, methods 200-800 as described above with respect to FIGS. 2-8.

Processing system 900 is generally an example of an electronic device configured to execute computer-executable instructions, such as those derived from compiled computer code, including without limitation personal computers, tablet computers, servers, smart phones, smart devices, wearable devices, augmented or virtual reality devices, and others.

In the depicted example, processing system 400 includes one or more processors 902, one or more input/output devices 904, one or more display devices 906, one or more network interfaces 908 through which processing system 900 is connected to one or more networks (e.g., a local network, an intranet, the Internet, or any other group of processing systems communicatively connected to each other), and computer-readable medium 970. In the depicted example, the aforementioned components are coupled by a bus 910, which may generally be configured for data exchange amongst the components. Bus 910 may be representative of multiple buses, while only one is depicted for simplicity.

Processor(s) 902 are generally configured to retrieve and execute instructions stored in one or more memories, including local memories like computer-readable medium 970, as well as remote memories and data stores. Similarly, processor(s) 902 are configured to store application data residing in local memories like the computer-readable medium 970, as well as remote memories and data stores. More generally, bus 910 is configured to transmit programming instructions and application data among the processor(s) 902, display device(s) 906, network interface(s) 908, or computer-readable medium 970. In certain embodiments, processor(s) 902 are representative of a one or more central processing units (CPUs), graphics processing unit (GPUs), tensor processing unit (TPUs), accelerators, and other processing devices.

Input/output device(s) 904 may include any device, mechanism, system, interactive display, or various other hardware and software components for communicating information between processing system 900 and a user of processing system 900. For example, input/output device(s) 904 may include input hardware, such as a keyboard, touch screen, button, microphone, speaker, or other device for receiving inputs from the user and sending outputs to the user.

Display device(s) 906 may generally include any sort of device configured to display data, information, graphics, user interface elements, and the like to a user. For example, display device(s) 906 may include internal and external displays such as an internal display of a tablet computer or an external display for a server computer or a projector. Display device(s) 906 may further include displays for devices, such as augmented, virtual, or extended reality devices. In various embodiments, display device(s) 906 may be configured to display a graphical user interface.

Network interface(s) 908 provide processing system 900 with access to external networks and thereby to external processing systems. Network interface(s) 908 can generally be any hardware or software capable of transmitting or receiving data via a wired or wireless network connection. Accordingly, network interface(s) 908 can include a communication transceiver for sending or receiving any wired or wireless communication.

Computer-readable medium 912 may be a volatile memory, such as a random access memory (RAM), or a nonvolatile memory, such as nonvolatile random access memory (NVRAM), or the like. In this example, computer-readable medium 912 includes a discovering module 971, a deploying module 972, a connecting module 973, a reading module 974, a receiving module 975, an onboarding module 976, an adding module 977, a generating module 978, a mapping module 979, a terminating module 980, a reconfiguring module 981, an instantiating module 982, an interfacing module 983, a communicating module 984, an updating module 985, a notifying module 986, a selecting module 987, an inputting module 988, a processing module 989, a utilizing module 990, a training module 991, a validating module 992, a testing module 993, an outputting module 994, and a reconfiguring module 995.

In certain embodiments, the discovering module 971 is configured to discover 202, 702, FIG. 2, FIG. 7, a sensor device; the deploying module 972 is configured to deploy 602, 702, FIG. 6, FIG. 7 a custom broker(s) to connect to a sensor device; the connecting module 973 is configured to connect 704, FIG. 7 the discovery node to the sensor device; the reading module 974 is configured to read 604, 708, FIG. 6, FIG. 7 data from a sensor device; the receiving module 975 is configured to receive a resource request(s) 404(1), 404(2), FIG. 4, or receive data from the sensor device; the onboarding module 976 configured to onboard 710, FIG. 7, the sensor device onto the distributed network; the adding module 977 configured to add 712, FIG. 7, sensor device data to a sensor device inventory on the distributed network.

In certain embodiments, the generating module 978 is configured to generate 606, FIG. 6, a resource abstraction of the sensor device; the mapping module 979 is configured to map 203, FIG. 2, a UID or other information of the sensor device from the data of the sensor device to metadata associated with one or more applications; the terminating module 980 is configured to terminate 306, FIG. 3, the sensor device or a service associated with the sensor device; the reconfiguring module 981 is configured to reconfigure 307, FIG. 3 settings of the one or more applications; the instantiating module 982 is configured to instantiate the resource abstraction as a service; the interfacing module 983 is configured to interface between one or more applications, sensor device service(s) or sensor device(s), e.g., via the broker(s) 405, FIG. 4.

In certain embodiments, the communicating module 984 is configured to communicate with the sensor device(s) via the common protocol; the updating module 985 is configured to update the status of the sensor device(s); the notifying module 986 is configured to notify the one or more applications of change in sensor device status; the selecting module 987 is configured to select the custom broker(s); the inputting module 988 is configured to input inference data to a multi-modality store of a multi-modal AI model; the a processing module 989 is configured to process data from the sensor device(s); the utilizing module 990 is configured to utilize a discovery service for the discovering of sensor device(s); the training module 991 configured to train inference data; the validating module 992 is configured to validate training data and training output data; the testing module 993 is configured to test output data and training output data; and the outputting module 994 is configured to output data from services including the inference services. In some aspects, the reconfiguring module 995 is configured to reconfigure settings of one or more applications, to replace the sensor device with a second sensor device.

Note that FIG. 9 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method, comprising discovering a sensor device, over a connection, by a discovery node of a distributed system; deploying a custom broker, by the discovery node, to connect to the sensor device, wherein the deploying of the custom broker is based on a common protocol of the custom broker and the sensor device; connecting the discovery node to the sensor device via the custom broker; reading, by the custom broker, data from the sensor device; onboarding the sensor device onto the distributed system, wherein the onboarding comprises mapping a unique sensor device identifier from the data to metadata associated with one or more applications on the distributed system; and adding sensor device data to a sensor device inventory on the distributed system, to represent the sensor device as a resource abstraction, wherein the resource abstraction can be instantiated as a service.

Clause 2: The method of Clause 1, further comprising selecting, by the discovery node, the custom broker based on at least one of the common protocol, or an interface of the sensor device.

Clause 3: The method of any of Clauses 1-2, wherein the deploying of the custom broker comprises selecting the custom broker based on at least one of the common protocol, or an interface of the sensor device.

Clause 4: The method of any of Clauses 1-3, further comprising communicating, by the custom broker with the sensor device via the common protocol.

Clause 5: The method of any of Clauses 1-4, wherein the sensor device data comprises the unique sensor device identifier.

Clause 6: The method of any of Clauses 1-5, wherein the metadata associated with one or more applications comprises at least one of a sensor name or a sensor location.

Clause 7: The method of any of Clauses 1-6, communicating, by the custom broker with the sensor device via the common protocol.

Clause 8: The method of any of Clauses 1-7, wherein the common protocol comprises at least one of Inter-Integrated circuit (I2C), Serial Peripheral Interface (SPI), Universal Asynchronous Receiver-Transmitter (UART), Controller Area Network (CAN), MODBUS, Bluetooth, Zigbee, or LoRaWAN.

Clause 9: The method of any of Clauses 1-8, wherein the connection is a wireless connection.

Clause 10: The method of any of Clauses 1-9, wherein the wireless connection comprises at least one of Wi-Fi, Bluetooth, a ZigBee network, Radio Frequency identification (RFID), Long range wireless connectivity (LoRa), or Near-Field communication (NFC).

Clause 11: The method of any of Clauses 1-10, wherein the sensor device comprises at least one of a temperature sensor, a proximity sensor, an infrared sensor, a light sensor, a smoke sensor, an Internet of Things (IoT) sensor, a pollution sensor, an RFID sensor, an image sensor, a biometric sensor, a printed sensor, a micro-electric mechanical systems (MEMS) sensor, or a nano-electro-mechanical systems (NEMS) sensor.

Clause 12: The method of any of Clauses 1-11, wherein the unique sensor device identifier comprises at least one of a MAC address or a custom identifier.

Clause 13: The method of any of Clauses 1-12, further comprising based on the discovering, deploying a pod in the discovery node, wherein the pod is used for the deploying of the custom broker.

Clause 14: The method of any of Clauses 1-13, wherein the pod is non-terminating.

Clause 15: The method of any of Clauses 1-14, further comprising discovering, by the distributed system, a removal of the sensor device; updating a status of the sensor device, by a sensor device manager of the distributed system; and notifying the one or more applications to run removal procedures, the removal procedures comprising at least one of calling sensor device APIs to check status of the sensor device or subscribing to sensor device events to receive status updates on the sensor device.

Clause 16: The method of any of Clauses 1-15 further comprising at least one of terminating at least one of the sensor device by the one or more applications, or a service of the sensor device by the one or more applications, or reconfiguring settings of the one or more applications, to replace the sensor device associated with the one or more applications with at least one replacement sensor device, wherein the reconfiguring is based on at least one of replacement of the sensor device by the at least one replacement sensor device or detection of replacement of the sensor device by the at least one replacement sensor device.

Clause 17: The method of any of Clauses 1-16, further comprising instantiating the service, by the distributed system, from the resource abstraction.

Clause 18: The method of any of Clauses 1-17, further comprising receiving, by the distributed system, a resource request for at least one of the sensor device or the service, from a first application of the one or more applications; and interfacing, by the custom broker, between the service and the sensor device, wherein the service can communicate with the first application via the custom broker, to cause the sensor device to act according to the service.

Clause 19: The method of any of Clauses 1-18, further comprising receiving, by the distributed system, a resource request for the sensor device, from a second application of the one or more applications; instantiating a second service, by the custom broker, wherein the second service can communicate with the second application via the custom broker; and interfacing, by the custom broker, between at least two of the service, the second service, and the sensor device to cause the sensor device to act according to at least one of the service or the second service.

Clause 20: The method of any of Clauses 1-19, further comprising generating inference data from the service or from at least one other service; inputting the inference data to a multi-modality store of a multi-modal AI model to generate at least one inference service; and generating application functionality based on the at least one inference service.

Clause 21: The method of any of Clauses 1-20, wherein the discovery node utilizes a discovery service for the discovering of the sensor device.

Clause 22: A method for integration and deployment of sensor devices as services in a distributed system, comprising deploying a custom broker, by a discovery node of a distributed system, to connect to a sensor device, wherein the deploying is based on a common protocol of the custom broker and the sensor device; reading, by the custom broker, data from the sensor device; and generating a resource abstraction of the sensor device, wherein the resource abstraction can be instantiated as a service.

Clause 23: The method of Clause 22 wherein the generating of the resource abstraction comprises at least one of mapping a unique sensor device identifier from the data to metadata associated with one or more applications on the distributed system, or adding sensor device data to a sensor device inventory on the distributed system.

Clause 24: The method of any of Clauses 22-23 further comprising discovering, over a connection, a sensor device by a discovery node of a distributed system; and connecting, the discovery node, via the custom broker, to the sensor device.

Clause 25: The method of any of Clauses 22-24 further comprising upon the discovering, deploying a pod in the discovery node, wherein the pod is used for the deploying of the custom broker.

Clause 26: The method of any of Clauses 22-25 wherein the pod is non-terminating.

Clause 27: The method of any of Clauses 22-26, further comprising selecting, by the discovery node, the custom broker based on at least one of the common protocol, or an interface of the sensor device.

Clause 28: The method of any of Clauses 22-27, wherein the deploying of the custom broker comprises selecting, by the discovery node, the custom broker based on at least one of the common protocol, or an interface of the sensor device.

Clause 29: The method of any of Clauses 22-28, wherein the common protocol comprises at least one of Inter-Integrated circuit (I2C), Serial Peripheral Interface (SPI), Universal Asynchronous Receiver-Transmitter (UART), Controller Area Network (CAN), MODBUS, Bluetooth, Zigbee, or LoRaWAN.

Clause 30: The method of any of Clauses 22-29, wherein the discovering of the sensor device is via a wireless connection.

Clause 31: The method of any of Clauses 22-30, wherein the wireless connection comprises at least one of Wi-Fi, Bluetooth, a zigbee network, Long range wireless connectivity (LoRa), Radio Frequency identification (RFID), or Near-Field communication (NFC).

Clause 32: The method of any of Clauses 22-31, wherein the sensor device comprises at least one of a temperature sensor, a proximity sensor, an infrared sensor, a light sensor, a smoke sensor, an Internet of Things (IoT) sensor, a pollution sensor, an RFID sensor, an image sensor, a biometric sensor, a printed sensor, a micro-electric mechanical systems (MEMS) sensor, or a nano-electro-mechanical systems (NEMS) sensor.

Clause 33: The method of any of Clauses 22-32, wherein the unique sensor device identifier comprises at least one of a MAC address or a custom identifier.

Clause 34: The method of any of Clauses 22-33, further comprising discovering, by the distributed system, a removal of the sensor device; updating a status of the sensor device, by a sensor device manager of the distributed system; and notifying one or more applications on the distributed system to run removal procedures, the removal procedures comprising at least one of calling sensor device APIs to check status of the sensor device or subscribing to sensor device events to receive status updates on the sensor device.

Clause 35: The method of any of Clauses 22-34, further comprising at least one of terminating at least one of the sensor device by the one or more applications, or a service of the sensor device by the one or more applications, or reconfiguring settings of the one or more applications, to replace the sensor device associated with the one or more applications with at least one replacement sensor device, wherein the reconfiguring is based on at least one of replacement of the sensor device by the at least one replacement sensor device or detection of replacement of the sensor device by the at least one replacement sensor device.

Clause 36: The method of any of Clauses 22-35, further comprising instantiating the service, by the distributed system, from the resource abstraction.

Clause 37: The method of any of Clauses 22-36, further comprising receiving, by the distributed system, a resource request for at least one of the sensor device or the service, from a first application of the one or more applications; and interfacing, by the custom broker, between the service and the sensor device, wherein the service can communicate with the first application via the custom broker, to cause the sensor device to act according to the service.

Clause 38: The method of any of Clauses 22-37, further comprising receiving, by the distributed system, a resource request for the sensor device, from a second application of the one or more applications; instantiating a second service, by the custom broker, wherein the second service can communicate with the second application via the custom broker; and interfacing, by the custom broker, between at least two of the service, the second service, and the sensor device to cause the sensor device to act according to at least one of the service or the second service.

Clause 39: The method of any of Clauses 22-38, further comprising generate inference data from the service or from at least one other service; input the inference data to a multi-modality store of a multi-modal AI model to generate at least one inference service; and generate application functionality based on the at least one inference service.

Clause 40: The method of any of Clauses 22-39, wherein the discovery node utilizes a discovery service for the discovering of the sensor device.

Clause 41: The method of any of Clauses 22-40, further comprising communicating, by the custom broker with the sensor device via the common protocol.

Clause 42: A method for integration and deployment of sensor devices as services in a distributed system, comprising deploying a custom broker, by a discovery node of a distributed system, to connect to a sensor device, wherein the deploying is based on a common protocol of the custom broker and the sensor device; reading, by the custom broker, data from the sensor device; representing the sensor device as a resource abstraction, wherein the resource abstraction can be instantiated as a service; and reconfiguring settings of one or more applications, to replace the sensor device associated with the one or more applications with a second sensor device, wherein the second sensor device is represented as a second resource abstraction instantiated as a second service.

Clause 43: The method of Clause 42 wherein the representing the sensor device as a resource abstraction comprises at least one of: mapping a unique sensor device identifier from the data to metadata associated with one or more applications on the distributed system, or adding sensor device data to a sensor device inventory on the distributed system.

Clause 44: One or more processing systems, comprising: one or more memories comprising computer-executable instructions; and one or more processors configured to execute the computer-executable instructions and cause the one or more processing systems to perform a method in accordance with any one of Clauses 1-43.

Clause 45: One or more processing systems, comprising means for performing a method in accordance with any one of Clauses 1-43.

Clause 46: One or more non-transitory computer-readable media comprising instructions that, when executed by one or more processors of a computing system, cause the computing system to perform the operations of any one of Clauses 1-43.

Clause 47: One or more computer program products embodied on one or more computer-readable storage media comprising code for performing a method in accordance with any one of Clauses 1-43.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Any use of the term "or" herein shall be construed as an inclusive "or" rather than an exclusive "or." This means that the term "or" is intended to encompass all possible combinations and alternatives, and is not to be interpreted as limiting the scope to only one of the options presented. For example, if the document states "A or B," it is to be understood that this could mean A, B, or both A and B. Similarly, for example, if the document specifies "provide a report by email or by mail," it is understood that the report can be provided by either method, or by both methods. The inclusive "or" shall apply in all instances where it appears, allowing for a broader interpretation that includes all specified options.

The methods disclosed herein comprise one or more steps or actions for achieving the methods. The method steps or actions may be interchanged with one another without departing from the scope of the claims. In other words, unless a specific order of steps or actions is specified, the order or use of specific steps or actions may be modified without departing from the scope of the claims. Further, the various operations of methods described above may be performed by any suitable means capable of performing the corresponding functions. The means may include various hardware or software component(s) or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
discovering a sensor device, over a connection, by a discovery node of a distributed system;
deploying a custom broker, by the discovery node, to connect to the sensor device, wherein the deploying of the custom broker is based on a common protocol of the custom broker and the sensor device;
connecting the discovery node to the sensor device via the custom broker;
reading, by the custom broker, data from the sensor device;
onboarding the sensor device onto the distributed system, wherein the onboarding comprises mapping a unique sensor device identifier from the data to metadata associated with one or more applications on the distributed system; and
adding sensor device data to a sensor device inventory on the distributed system, to represent the sensor device as a resource abstraction, wherein the resource abstraction can be instantiated as a service.

2. The method of claim 1, further comprising:
selecting, by the discovery node, the custom broker based on at least one of the common protocol, or an interface of the sensor device.

3. The method of claim 1, wherein the deploying of the custom broker comprises selecting the custom broker based on at least one of the common protocol, or an interface of the sensor device.

4. The method of claim 1, further comprising:
communicating, by the custom broker with the sensor device via the common protocol.

5. The method of claim 1, wherein the sensor device data comprises the unique sensor device identifier.

6. The method of claim 1, wherein the metadata associated with one or more applications comprises at least one of a sensor name or a sensor location.

7. The method of claim 1, wherein the sensor device comprises at least one of a temperature sensor, a proximity sensor, an infrared sensor, a light sensor, a smoke sensor, an Internet of Things (IoT) sensor, a pollution sensor, an RFID sensor, an image sensor, a biometric sensor, a printed sensor, a micro-electric mechanical systems (MEMS) sensor, or a nano-electro-mechanical systems (NEMS) sensor.

8. The method of claim 1 further comprising:
based on the discovering, deploying a pod in the discovery node, wherein the pod is used for the deploying of the custom broker.

9. The method of claim 1, further comprising:
discovering, by the distributed system, a removal of the sensor device;
updating a status of the sensor device, by a sensor device manager of the distributed system; and
notifying the one or more applications to run removal procedures, the removal procedures comprising at least one of calling sensor device APIs to check status of the sensor device or subscribing to sensor device events to receive status updates on the sensor device.

10. The method of claim 9, further comprising at least one of:
terminating at least one of the sensor device by the one or more applications, or a service of the sensor device by the one or more applications, or
reconfiguring settings of the one or more applications, to replace the sensor device associated with the one or more applications with at least one replacement sensor device, wherein the reconfiguring is based on at least one of a replacement of the sensor device by the at least one replacement sensor device or a detection of replacement of the sensor device by the at least one replacement sensor device.

11. The method of claim 1, further comprising:
instantiating the service, by the distributed system, from the resource abstraction.

12. The method of claim 1, further comprising:
receiving, by the distributed system, a resource request for at least one of the sensor device or the service, from a first application of the one or more applications; and
interfacing, by the custom broker, between the service and the sensor device, wherein the service can communicate with the first application via the custom broker, to cause the sensor device to act according to the service.

13. The method of claim 12, further comprising:
receiving, by the distributed system, a resource request for the sensor device, from a second application of the one or more applications;
instantiating a second service, by the custom broker, wherein the second service can communicate with the second application via the custom broker; and
interfacing, by the custom broker, between at least two of the service, the second service, and the sensor device to cause the sensor device to act according to at least one of the service or the second service.

14. The method of claim 1, further comprising:
generating inference data from the service or from at least one other service;
inputting the inference data to a multi-modality store of a multi-modal AI model to generate at least one inference service; and
generating application functionality based on the at least one inference service.

15. A processing system, comprising:
a memory comprising computer-executable instructions; and a processor configured to execute the computer-executable instructions and cause the processing system to:

discover, over a connection, a sensor device by a discovery node of a distributed system;

deploy a custom broker, by the discovery node, to connect to the sensor device, wherein deployment of the custom broker is based on a common protocol of the custom broker and the sensor device;

connect, the discovery node, via the custom broker, to the sensor device;

read, by the custom broker, data from the sensor device;

onboard the sensor device onto the distributed system, wherein the onboarding comprises mapping a unique sensor device identifier from the data to metadata associated with one or more applications on the distributed system; and add sensor device data to a sensor device inventory on the distributed system, to represent the sensor device as a resource abstraction, wherein the resource abstraction can be instantiated as a service.

16. The processing system of claim 15, wherein to deploy the custom broker comprises the processor being configured to cause the processing system to:

select the custom broker based on at least one of the common protocol, or an interface of the sensor device; and communicate, by the custom broker with the sensor device via the common protocol.

17. The processing system of claim 15, wherein the metadata associated with one or more applications comprises at least one of a sensor name or a sensor location.

18. The processing system of claim 15, wherein the sensor device comprises at least one of a temperature sensor, a proximity sensor, an infrared sensor, a light sensor, a smoke sensor, an Internet of Things (IoT) sensor, a pollution sensor, an RFID sensor, an image sensor, a biometric sensor, a printed sensor, a micro-electric mechanical systems (MEMS) sensor, or a nano-electro-mechanical systems (NEMS) sensor.

19. A method for integration and deployment of sensor devices as services in a distributed system, comprising:

deploying a custom broker, by a discovery node of a distributed system, to connect to a sensor device, wherein the deploying is based on a common protocol of the custom broker and the sensor device;

reading, by the custom broker, data from the sensor device;

representing the sensor device as a resource abstraction, wherein the resource abstraction can be instantiated as a service; and reconfiguring settings of one or more applications, to replace the sensor device associated with the one or more applications with a second sensor device, wherein the second sensor device is represented as a second resource abstraction instantiated as a second service.

20. The method of claim 19 wherein the representing the sensor device as a resource abstraction comprises at least one of:

mapping a unique sensor device identifier from the data to metadata associated with one or more applications on the distributed system, or adding sensor device data to a sensor device inventory on the distributed system.

* * * * *